(12) United States Patent
Kaku et al.

(10) Patent No.: US 10,290,889 B2
(45) Date of Patent: May 14, 2019

(54) REDOX FLOW BATTERY (71) Applicant: Sumitomo Electric Industries, Ltd., Osaka-shi (JP)

(72) Inventors: Hirokazu Kaku, Osaka (JP); Yongrong Dong, Osaka (JP); Kei Hanafusa, Osaka (JP); Ryojun Sekine, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 156 days.

(21) Appl. No.: 14/909,855

(22) PCT Filed: Aug. 4, 2014

(86) PCT No.: PCT/JP2014/070424
§ 371 (c)(1),
(2) Date: Feb. 3, 2016

(87) PCT Pub. No.: WO2015/019974
PCT Pub. Date: Feb. 12, 2015

(65) Prior Publication Data
US 2016/0181640 A1 Jun. 23, 2016

(30) Foreign Application Priority Data
Aug. 7, 2013 (JP) ................................ 2013-164543

(51) Int. Cl.
*H01M 8/08* (2016.01)
*H01M 8/20* (2006.01)
*H01M 8/18* (2006.01)

(52) U.S. Cl.
CPC ............ *H01M 8/08* (2013.01); *H01M 8/188* (2013.01); *H01M 8/20* (2013.01);
(Continued)

(58) Field of Classification Search
CPC ............ H01M 8/08; H01M 8/20; H01M 8/18; H01M 8/188
See application file for complete search history.

(56) References Cited

U.S. PATENT DOCUMENTS 8,288,030 B2 * 10/2012 Dong ................ H01M 8/04186
429/101
2014/0134465 A1 5/2014 Kumamoto et al.

FOREIGN PATENT DOCUMENTS

EP  2 387 092 A1  11/2011
JP  4835792 B2    12/2011
(Continued)

OTHER PUBLICATIONS

International Search Report in International PCT Application No. PCT/JP2014/070424, dated Sep. 22, 2014.
(Continued)

*Primary Examiner* — Karie O'Neill Apicella
(74) *Attorney, Agent, or Firm* — Baker Botts L.L.P.; Michael A. Sartori (57) ABSTRACT

Provided is a redox flow battery that allows suppression of generation of precipitate and also has a high energy density. The redox flow battery includes a battery cell including a positive electrode, a negative electrode, and a membrane interposed between the electrodes, the battery being configured to be charged and discharged while a positive electrode electrolyte and a negative electrode electrolyte are supplied to the battery cell, wherein the positive electrode electrolyte contains manganese ions, titanium ions, and reactive metal ions, the negative electrode electrolyte contains at least one species of metal ions selected from titanium ions, vanadium ions, chromium ions, and zinc ions, and the reactive metal ions are at least one selected from vanadium ions, chromium ions, iron ions, cobalt ions, copper ions, molybdenum ions,
(Continued)

ruthenium ions, palladium ions, silver ions, tungsten ions, mercury ions, and cerium ions.

13 Claims, 1 Drawing Sheet

(52) U.S. Cl.
CPC ............... *H01M 2300/0005* (2013.01); *H01M 2300/0011* (2013.01); *Y02E 60/528* (2013.01)

(56) References Cited

FOREIGN PATENT DOCUMENTS

| | | | | |
|---|---|---|---|---|
| JP | 2012-079679 A | 4/2012 | | |
| JP | 2012-160344 A | 8/2012 | | |
| JP | 2012-518247 A | 8/2012 | | |
| JP | 2013-008642 A | 1/2013 | | |
| JP | 2013008642 A | * | 1/2013 | ............ H01M 8/04 |
| JP | 2013-037776 A | 2/2013 | | |
| JP | 2013-037814 A | 2/2013 | | |
| WO | WO-89/05526 A1 | 6/1989 | | |
| WO | WO-2011/136256 A1 | 3/2011 | | |
| WO | 2013/002137 A1 | 1/2013 | | |

OTHER PUBLICATIONS

Extended European Search Report in European Patent Application No. 14833875.9, dated Jul. 13, 2016.

* cited by examiner

REDOX FLOW BATTERY

TECHNICAL FIELD

The present invention relates to a redox flow battery. In particular, the present invention relates to a redox flow battery that allows suppression of generation of precipitate and also has a high energy density.

BACKGROUND ART

In recent years, with electric power shortage becoming serious, there have been challenges that are global rapid adoption of natural energy such as the adoption of wind power generation and photovoltaic power generation and the stabilization of power systems (for example, maintaining of frequency and voltage). One technique for addressing the challenges has been attracting attention and this technique is to install high-capacity secondary batteries to achieve, for example, smoothing of output variations, storage of surplus power, and load leveling.

One of such high-capacity secondary batteries is a redox flow battery (hereafter, sometimes referred to as an RF battery). The RF battery has the following features, for example: (1) a high capacity in the megawatt class (MW class) is easily achieved, (2) the long life, and (3) the state of charge of the battery can be accurately monitored. Thus, the RF battery is expected to be optimum as a secondary battery used for the stabilization of power systems.

The RF battery includes a battery cell having a positive electrode, a negative electrode, and a membrane interposed between the electrodes and is charged and discharged while a positive electrode electrolyte and a negative electrode electrolyte are supplied to the battery cell. The electrolytes for the electrodes are typically solutions containing, as active materials, metal ions that undergo changes in valence by oxidation-reduction. Typically, there are an Fe—Cr-based RF battery employing iron (Fe) ions as the positive electrode active material and chromium (Cr) ions as the negative electrode active material, and a V-based RF battery employing vanadium (V) ions as the active material of the two electrodes (Paragraph 0003 in Description of Patent Literature 1).

Patent Literature 1 discloses, as an RF battery that can provide a higher electromotive force than the existing V-based RF batteries, a Mn—Ti-based RF battery employing manganese (Mn) ions as the positive electrode active material and titanium (Ti) ions or the like as the negative electrode active material. Patent Literature 1 also discloses that titanium ions are additionally contained in the positive electrode electrolyte, so that generation of precipitate such as manganese oxide ($MnO_2$) can be suppressed and the reaction of $Mn^{2+}/Mn^{3+}$ can be performed with stability.

CITATION LIST

Patent Literature

PTL 1: Japanese Patent No. 4835792

SUMMARY OF INVENTION

Technical Problem

There has been a demand for the development of a redox flow battery having a higher energy density.

The Mn—Ti-based RF battery disclosed in PTL 1 contains titanium ions in the positive electrode electrolyte, so that, as described above, generation of precipitate can be suppressed. However, basically, titanium ions in the positive electrode electrolyte do not function as a positive electrode active material and do not contribute to charge and discharge. Thus, when the total concentration of metal ions in the positive electrode electrolyte is set to a certain value and titanium ions are contained, the ratio of active material in the positive electrode electrolyte decreases accordingly, resulting in a low energy density. When an electrolyte having a low ratio of active material is used to provide a large-energy-capacity redox flow battery, for example, a large amount of the electrolyte needs to be used. This results in, for example, an increase in the volume of the tank, an increase in the size of the whole RF battery system (an increase in the size of the installation space) due to the increase in the size of the tank, and an increase in the cost of the electrolyte.

Accordingly, an object of the present invention is to provide a redox flow battery that allows suppression of generation of precipitate and also has a high energy density.

Solution to Problem

A redox flow battery according to an embodiment of the present invention includes a battery cell including a positive electrode, a negative electrode, and a membrane interposed between the electrodes, the battery being configured to be charged and discharged while a positive electrode electrolyte and a negative electrode electrolyte are supplied to the battery cell. The positive electrode electrolyte contains manganese ions, titanium ions, and reactive metal ions. The negative electrode electrolyte contains at least one species of metal ions selected from titanium ions, vanadium ions, chromium ions, and zinc ions. The reactive metal ions are at least one selected from vanadium ions, chromium ions, iron ions, cobalt ions, copper ions, molybdenum ions, ruthenium ions, palladium ions, silver ions, tungsten ions, mercury ions, and cerium ions.

Advantageous Effects of Invention

A redox flow battery according to the present invention allows suppression of generation of precipitate and also has a high energy density.

DESCRIPTION OF EMBODIMENTS

Description of Embodiments According to the Present Invention

In order to increase the energy density of a redox flow battery employing manganese ions as the positive electrode active material, the inventors of the present invention performed studies on use of plural ion species that function as active materials. As a result, the inventors have found remarkable findings that specific metal ions function as active materials in a positive electrode electrolyte and can also suppress generation of precipitate such as manganese oxide. On the basis of the findings, proposed is a configuration in which a positive electrode electrolyte contains, in addition to manganese ions serving as a positive electrode active material, other metal ions that function as an active material and also provides the effect of suppressing generation of precipitate. First, features of embodiments according to the present invention will be listed and described.

(1) A redox flow battery according to an embodiment includes a battery cell including a positive electrode, a negative electrode, and a membrane interposed between the electrodes, the battery being configured to be charged and discharged while a positive electrode electrolyte and a negative electrode electrolyte are supplied to the battery cell. The positive electrode electrolyte contains manganese ions, titanium ions, and reactive metal ions. The negative electrode electrolyte contains at least one species of metal ions selected from titanium ions, vanadium ions, chromium ions, and zinc (Zn) ions. The reactive metal ions are at least one selected from vanadium ions, chromium ions, iron (Fe) ions, cobalt (Co) ions, copper (Cu) ions, molybdenum (Mo) ions, ruthenium (Ru) ions, palladium (Pd) ions, silver (Ag) ions, tungsten (W) ions, mercury (Hg) ions, and cerium (Ce) ions. The reactive metal ions are ions that have the function of serving as a positive electrode active material and the function of suppressing generation of precipitate.

The RF battery according to the embodiment employs, as a positive electrode active material, manganese ions contained in the positive electrode electrolyte, so that the following advantages are provided: (1) a high electromotive force can be achieved, compared with the existing V-based RF batteries and the like, (2) manganese ions are water-soluble metal ions and hence the electrolyte can be prepared as an aqueous solution with ease of production, and (3) manganese ions are relatively inexpensive and are preferable from the standpoint of supply of the resource. In addition, in the RF battery according to the embodiment, specific metal ions (reactive metal ions) contained in the positive electrode electrolyte also function as a positive electrode active material, so that the ratio of active material in the electrolyte can be increased. Accordingly, the RF battery according to the embodiment has a higher energy density than an RF battery including a positive electrode electrolyte containing manganese ions and titanium ions and not containing the reactive metal ions. For the RF battery according to the embodiment, in addition to titanium ions, the reactive metal ions can also suppress generation of precipitate. Accordingly, even when the state of charge is increased, an increase in the cell resistance due to precipitate can be suppressed and the cell resistance is low. Thus, the RF battery according to the embodiment has excellent battery characteristics. In addition, the RF battery according to the embodiment allows reduction of the size of the tank, reduction in the size of the installation space, reduction in the cost of the electrolyte, and the like.

(2) An example of the RF battery according to the embodiment is an embodiment in which the positive electrode electrolyte further contains additive metal ions. The additive metal ions are at least one selected from aluminum (Al) ions, cadmium (Cd) ions, indium (In) ions, tin (Sn) ions, antimony (Sb) ions, iridium (Ir) ions, gold (Au) ions, lead (Pb) ions, bismuth (Bi) ions, and magnesium (Mg) ions. The additive metal ions are ions that substantially do not function as an active material and that have the function of suppressing generation of precipitate.

The inventors of the present invention performed studies and, as a result, have found that the presence of the above-described specific metal ions (additive metal ions) together with manganese ions in the positive electrode electrolyte allows suppression of generation of precipitate such as manganese oxide. In particular, the inventors have found that even a very low content of additive metal ions provides the effect of suppressing generation of precipitate. In the embodiment, in addition to titanium ions and reactive metal ions, additive metal ions are contained, so that generation of precipitate can be more effectively suppressed. In the embodiment, the content of titanium ions and additive metal ions is reduced, so that a decrease in the ratio of active material in the electrolyte can be suppressed and a high energy density can be achieved.

(3) An example of the RF battery according to the embodiment is an embodiment in which the concentration of the reactive metal ions (total concentration when plural species are contained) in the positive electrode electrolyte is 0.001 M or more and 5 M or less. M described as the unit of concentration represents volumetric molar concentration, that is, mol/L (moles/liter). The same applies to concentrations below.

In the embodiment, reactive metal ions are contained in the above-described specific range, so that the following advantages are provided: (1) reactive metal ions are effectively used as an active material and a high energy density can be achieved, (2) generation of precipitate can be suppressed, and (3) reactive metal ions are sufficiently dissolved even when the electrolyte is an acid aqueous solution, and the electrolyte is easily produced.

(4) An example of the RF battery according to the embodiment is an embodiment in which, when the above-described additive metal ions are contained, the concentration of the additive metal ions (total concentration when plural species are contained) in the positive electrode electrolyte is 0.001 M or more and 1 M or less.

In the embodiment, additive metal ions are contained in the above-described specific range, so that generation of precipitate can be effectively suppressed.

(5) An example of the RF battery according to the embodiment is an embodiment in which at least one of the concentration of the manganese ions in the positive electrode electrolyte and the concentration of the metal ions in the negative electrode electrolyte is 0.3 M or more and 5 M or less. When the metal ions contained in the negative electrode electrolyte are plural ion species, the total concentration satisfies the range.

In the embodiment, such metal ions that function as an active material of each electrode are contained in the above-described specific range, so that the following advantages are provided: (i) a sufficiently large amount of the metal element that undergoes a valence-change reaction is contained and a high energy density can be achieved, and (ii) the metal ions are sufficiently dissolved even when the electrolyte is an acid aqueous solution, and the electrolyte is easily produced.

(6) An example of the RF battery according to the embodiment is an embodiment in which the negative electrode electrolyte contains, as the metal ions, titanium ions, and at least one of the concentration of the manganese ions in the positive electrode electrolyte and the concentration of the titanium ions in the negative electrode electrolyte is 0.3 M or more and 5 M or less.

In the embodiment, the concentration of the manganese ions or the concentration of the titanium ions satisfies the specific range, so that a Mn—Ti-based RF battery having a high energy density can be provided and the advantage (ii) described in the embodiment (5) is also provided.

(7) An example of the RF battery according to the embodiment is an embodiment in which the concentration of the titanium ions in the positive electrode electrolyte is 5 M or less.

In the embodiment, titanium ions in the positive electrode electrolyte allow suppression of generation of precipitate. In addition, the concentration of the titanium ions is in the above-described specific range, so that the titanium ions are sufficiently dissolved even when the electrolyte is an acid aqueous solution, and the electrolyte is easily produced.

(8) An example of the RF battery according to the embodiment is an embodiment in which the reactive metal ions satisfy at least one of (A) to (L) below:

(A) the vanadium ions are at least one of divalent vanadium ions, trivalent vanadium ions, tetravalent vanadium ions, and pentavalent vanadium ions, (B) the chromium ions are at least one of divalent chromium ions, trivalent chromium ions, tetravalent chromium ions, and hexavalent chromium ions, (C) the iron ions are at least one of divalent iron ions and trivalent iron ions, (D) the cobalt ions are at least one of divalent cobalt ions and trivalent cobalt ions, (E) the copper ions are at least one of monovalent copper ions and divalent copper ions, (F) the molybdenum ions are at least one of tetravalent molybdenum ions, pentavalent molybdenum ions, and hexavalent molybdenum ions, (G) the ruthenium ions are at least one of divalent ruthenium ions, trivalent ruthenium ions, and tetravalent ruthenium ions, (H) the palladium ions are at least one of divalent palladium ions and tetravalent palladium ions, (I) the silver ions are at least one of monovalent silver ions and divalent silver ions, (J) the tungsten ions are at least one of tetravalent tungsten ions, pentavalent tungsten ions, and hexavalent tungsten ions, (K) the mercury ions are at least one of monovalent mercury ions and divalent mercury ions, and (L) the cerium ions are at least one of trivalent cerium ions and tetravalent cerium ions.

The listed metal ions having valences function as positive electrode active materials and also provide the effect of suppressing generation of precipitate. Accordingly, in the embodiment, a high energy density is achieved and generation of precipitate can be suppressed.

(9) An example of the RF battery according to the embodiment is an embodiment in which the negative electrode electrolyte contains titanium ions and further contains manganese ions.

In the embodiment, the positive electrode electrolyte and the negative electrode electrolyte each contain manganese ions and titanium ions. Thus, in the embodiment, the electrolytes of the electrodes have plural ion species in common. Accordingly, the embodiment provides the following advantages: (i) a decrease in the battery capacity tends to be avoided, the decrease being caused by migration of metal ions to counter electrodes and by the corresponding decrease in the amount of metal ions (active materials) supposed to react at electrodes, (ii) even when liquid migration (a phenomenon in which the electrolyte of one electrode migrates to the other electrode) occurs with time due to charge and discharge and an imbalance is caused between the liquid amounts of the electrolytes at the electrodes, the imbalance can be easily corrected, and (iii) the electrolytes are easily produced. Accordingly, the embodiment is practical and is expected to be easily used.

(10) An example of the RF battery according to the embodiment is an embodiment in which the negative electrode electrolyte contains titanium ions and further contains manganese ions and the reactive metal ions.

In the embodiment, the positive electrode electrolyte and the negative electrode electrolyte each contain manganese ions, titanium ions, and reactive metal ions. Thus, in the embodiment, the electrolytes of the electrodes each contain plural ion species and the electrolytes of the electrodes have plural ion species in common; typically, all the ion species are the same between the electrolytes of the electrodes. Accordingly, the embodiment provides the following advantages: (i) the above-described decrease in the battery capacity due to the decrease in the amounts of active materials with time tends to be further avoided, (ii) even when liquid migration occurs with time due to charge and discharge and an imbalance is caused between the liquid amounts of the electrolytes at the electrodes, the imbalance can be easily corrected, and (iii) the electrolytes are more easily produced.

(11) An example of the RF battery according to the embodiment is an embodiment in which, when the positive electrode electrolyte contains the additive metal ions, the negative electrode electrolyte contains titanium ions and further contains manganese ions, the reactive metal ions, and the additive metal ions.

In the embodiment, the positive electrode electrolyte and the negative electrode electrolyte each contain manganese ions, titanium ions, reactive metal ions, and additive metal ions. Thus, in the embodiment, the electrolytes of the electrodes each contain plural ion species and the electrolytes of the electrodes have plural ion species in common; typically, all the ion species are the same between the electrolytes of the electrodes. Accordingly, as with the embodiment (10), the embodiment provides the following advantages: (i) the above-described decrease in the battery capacity due to the decrease in the amounts of active materials with time tends to be further avoided, (ii) even when liquid migration occurs with time due to charge and discharge and an imbalance is caused between the liquid amounts of the electrolytes at the electrodes, the imbalance can be easily corrected, and (iii) the electrolytes are more easily produced.

(12) An example of the RF battery according to the embodiment is an embodiment in which, when the negative electrode electrolyte contains manganese ions, the concentration of the manganese ions in the negative electrode electrolyte is 0.3 M or more and 5 M or less.

The embodiment provides advantages as in the above-described embodiments (9) to (11). Specifically, in the embodiment, at least a decrease in the battery capacity due to a decrease in the amount of the positive electrode active material with time can be suppressed. In addition, in the embodiment, the concentration of manganese ions in the negative electrode electrolyte is in the above-described specific range, so that the manganese ions are sufficiently dissolved even when the electrolyte is an acid aqueous solution, and the electrolyte is easily produced.

(13) An example of the RF battery according to the embodiment is an embodiment in which, when the positive electrode electrolyte contains the additive metal ions, the additive metal ions satisfy at least one of (a) to (j) below:

(a) the aluminum ions are at least one of monovalent aluminum ions, divalent aluminum ions, and trivalent aluminum ions, (b) the cadmium ions are at least one of monovalent cadmium ions and divalent cadmium ions, (c) the indium ions are at least one of monovalent indium ions, divalent indium ions, and trivalent indium ions, (d) the tin ions are at least one of divalent tin ions and tetravalent tin ions, (e) the antimony ions are at least one of trivalent antimony ions and pentavalent antimony ions, (f) the iridium ions are at least one of monovalent iridium ions, divalent iridium ions, trivalent iridium ions, tetravalent iridium ions, pentavalent iridium ions, and hexavalent iridium ions, (g) the gold ions are at least one of monovalent gold ions, divalent gold ions, trivalent gold ions, tetravalent gold ions, and pentavalent gold ions, (h) the lead ions are at least one of divalent lead ions and tetravalent lead ions, (i) the bismuth ions are at least one of trivalent bismuth ions and pentavalent bismuth ions, and (j) the magnesium ions are at least one of monovalent magnesium ions and divalent magnesium ions.

The listed metal ions having valences provide the effect of suppressing generation of precipitate. Accordingly, in the embodiment, in addition to the reactive metal ions, additive metal ions having such a valence are contained, so that generation of precipitate can be more effectively suppressed.

(14) An example of the RF battery according to the embodiment is an embodiment in which the manganese ions are at least one of divalent manganese ions and trivalent manganese ions, and the titanium ions are at least one of trivalent titanium ions and tetravalent titanium ions.

The listed manganese ions having valences function as positive electrode active materials in the positive electrode electrolyte. In particular, tetravalent titanium ions provide the effect of suppressing generation of precipitate in the positive electrode electrolyte. When the listed titanium ions having valences are contained in the negative electrode electrolyte, the titanium ions function as negative electrode active materials, so that the embodiment can form a Mn—Ti-based RF battery configured to provide a high electromotive force. When the listed manganese ions having valences are contained also in the negative electrode electrolyte, an advantage as in the above-described embodiments (9) to (11) is provided: at least a decrease in the battery capacity due to a decrease in the amount of the positive electrode active material with time can be suppressed.

Details of Embodiments According to the Present Invention

Hereinafter, redox flow batteries according to embodiments of the present invention will be described in detail. However, the present invention is not limited to these examples. The scope of the present invention is indicated by Claims and is intended to embrace all the modifications within the meaning and range of equivalency of the Claims. For example, in Test Examples described later, the following conditions can be appropriately changed: the concentration of manganese ions and the concentration of titanium ions in the positive electrode electrolyte, the species and concentration of metal ions (negative electrode active material) in the negative electrode electrolyte, the types and acid concentrations of acids of the electrolytes for the electrodes, the species and concentrations of reactive metal ions and additive metal ions, the amounts of the electrolytes, the materials and sizes of the electrodes, and the material of the membrane, for example.

Figure 1:
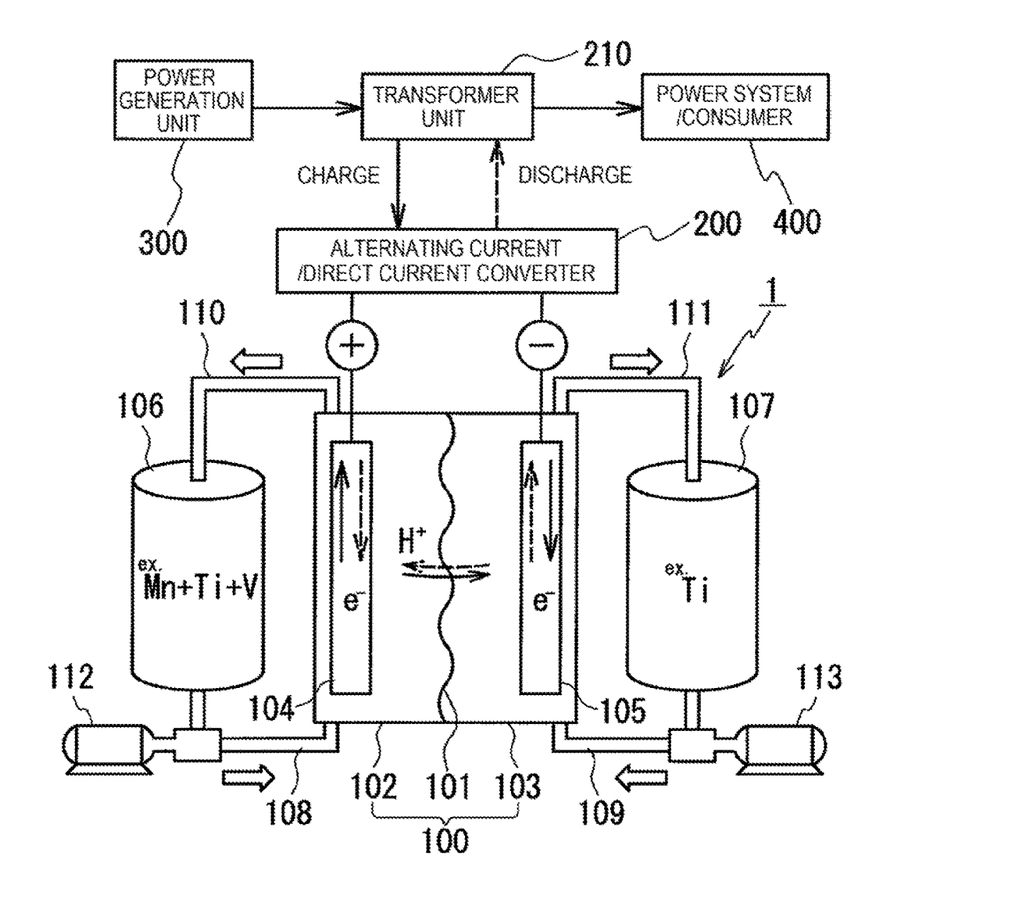
FIG. 1 is an explanatory view illustrating the principle of operation of a battery system including a redox flow battery according to an embodiment.

First, referring to FIG. 1, the overview of a battery system including a redox flow battery according to an embodiment will be described and, after which, the electrolytes will be described in detail. The elements described in the tanks in FIG. 1 are examples of ion species contained in the electrolytes. In FIG. 1, solid-line arrows indicate charge and broken-line arrows indicate discharge.

(Overall Configuration)

Typically, a redox flow battery (RF battery) 1 according to an embodiment is connected via, for example, an alternating current/direct current converter 200 and a transformer unit 210, to a power generation unit 300 (for example, a photovoltaic power generator, a wind power generator, or another ordinary power plant) and a power system or consumer (power system/consumer 400). The RF battery 1 is charged with the power generation unit 300 serving as a power supply source and is discharged to supply electric power to the power system/consumer 400. In order to perform the charge and discharge, the following battery system is assembled so as to include the RF battery 1 and a circulation mechanism (tanks, ducts, and pumps) for circulating electrolytes in the RF battery 1.

The RF battery 1 includes, as a main component, a battery cell 100 that includes a positive electrode cell 102 having a positive electrode 104 therein, a negative electrode cell 103 having a negative electrode 105 therein, and a membrane 101 separating the cells 102 and 103 from each other and being permeable to predetermined ions. The positive electrode cell 102 is connected to a positive electrode electrolyte tank 106 through ducts 108 and 110. The negative electrode cell 103 is connected to a negative electrode electrolyte tank 107 through ducts 109 and 111. The ducts 108 and 109 are equipped with pumps 112 and 113 for circulating the electrolytes for the electrodes. In the RF battery 1, the positive electrode electrolyte in the tank 106 and the negative electrode electrolyte in the tank 107 are respectively supplied to the positive electrode cell 102 (positive electrode 104) and the negative electrode cell 103 (negative electrode 105) by circulation with the ducts 108 to 111 and the pumps 112 and 113. Thus, metal ions serving as active materials in the electrolytes at the electrodes undergo valence-change reactions, so that the RF battery 1 is charged and discharged.

Typically, the RF battery 1 is used in a form referred to as a cell stack in which plural battery cells 100 are stacked. The cells 102 and 103 are typically constituted by cell frames: each cell frame includes a bipolar plate (not shown) on one surface of which the positive electrode 104 is to be disposed and on another surface of which the negative electrode 105 is to be disposed, and a frame (not shown) having liquid supply holes for supplying the electrolytes and liquid drainage holes for draining the electrolytes, and formed on the periphery of the bipolar plate. By stacking plural cell frames, the liquid supply holes and the liquid drainage holes form fluid paths for the electrolytes. The fluid paths are connected to the ducts 108 to 111. The cell stack is structured by repeatedly stacking a cell frame, the positive electrode 104, the membrane 101, the negative electrode 105, a cell frame, . . . , in this order. The basic structure of the RF battery system may be appropriately selected from known structures.

In the RF battery 1 according to the embodiment, the positive electrode electrolyte contains manganese ions and titanium ions, and the negative electrode electrolyte contains at least one species of metal ions selected from titanium ions, vanadium ions, chromium ions, and zinc ions. In the RF battery 1 according to the embodiment, the positive electrode electrolyte further contains, as specific metal ions having plural functions, reactive metal ions.

(Electrolytes)

Positive Electrode Electrolyte

Manganese Ions

In the RF battery 1 according to the embodiment, the positive electrode electrolyte contains, as a positive electrode active material, manganese ions. For the manganese ions, the positive electrode electrolyte contains at least one ion species in terms of valence: for example, divalent manganese ions or trivalent manganese ions. In addition, the electrolyte may contain tetravalent manganese. This tetravalent manganese is probably $MnO_2$. This $MnO_2$ is present not as solid precipitate but in a stable state of being dissolved in the electrolyte; and, during discharge, $MnO_2$ undergoes a two-electron reaction ($Mn^{4+}+2e^-\rightarrow Mn^{2+}$) and is reduced to $Mn^{2+}$. Thus, $MnO_2$ discharges electricity to serve as an active material and can be repeatedly used, which can contribute to an increase in the battery capacity. For this reason, the positive electrode electrolyte may contain tetravalent manganese in a small amount (about 10% or less relative to the total content (mol) of manganese ions).

In the positive electrode electrolyte, the concentration of manganese ions (hereafter, referred to as Mn content) is, for example, 0.3 M or more and 5 M or less. When the Mn content is 0.3 M or more, a sufficiently high energy density (for example, about 10 $kWh/m^3$) for a high-capacity secondary battery can be provided. The higher the Mn content, the higher the energy density. Accordingly, the Mn content may be 0.5 M or more, particularly 1.0 M or more. In the RF battery 1 according to the embodiment, the positive electrode electrolyte also contains titanium ions and reactive metal ions described later. As a result, even when the concentration of manganese ions is increased, generation of precipitate can be sufficiently suppressed and manganese ions are present with stability. However, in consideration of solubility in the solvent, the Mn content may be 5 M or less, particularly 2 M or less, which contributes to ease of use and ease of production of the electrolyte.

Titanium Ions

In the RF battery 1 according to the embodiment, the positive electrode electrolyte further contains titanium ions. The titanium ions function as an agent for suppressing generation of precipitate such as manganese oxide, and substantially do not function as a positive electrode active material. Typically, the titanium ions are present as tetravalent titanium ions in the positive electrode electrolyte. Examples of tetravalent titanium ions include $TiO^{2+}$. In the positive electrode electrolyte, the concentration of titanium ions (hereafter, referred to as Ti content) is, for example, 5 M or less (exclusive of 0). When the Ti content is 5 M or less, Ti is sufficiently dissolved even when the electrolyte is, for example, an acid aqueous solution, and the electrolyte is easily produced.

Reactive Metal Ions

In the RF battery 1 according to the embodiment, the positive electrode electrolyte further contains reactive metal ions. The reactive metal ions function as a positive electrode active material and also function as an agent for suppressing generation of precipitate such as manganese oxide. Thus, the RF battery 1 according to the embodiment contains, as agents for suppressing generation of precipitate, at least two species of metal ions (titanium ions and reactive metal ions). Specifically, the reactive metal ions are at least one selected from vanadium ions, chromium ions, iron ions, cobalt ions, copper ions, molybdenum ions, ruthenium ions, palladium ions, silver ions, tungsten ions, mercury ions, and cerium ions. For each species of these reactive metal ions for the positive electrode electrolyte, there is at least one ion species in terms of valence. For example, (A) vanadium ions include divalent vanadium ions, trivalent vanadium ions, tetravalent vanadium ions, and pentavalent vanadium ions. (B) Chromium ions include divalent chromium ions, trivalent chromium ions, tetravalent chromium ions, and hexavalent chromium ions. (C) Iron ions include divalent iron ions and trivalent iron ions. (D) Cobalt ions include divalent cobalt ions and trivalent cobalt ions. (E) Copper ions include monovalent copper ions and divalent copper ions. (F) Molybdenum ions include tetravalent molybdenum ions, pentavalent molybdenum ions, and hexavalent molybdenum ions. (G) Ruthenium ions include divalent ruthenium ions, trivalent ruthenium ions, and tetravalent ruthenium ions. (H) Palladium ions include divalent palladium ions and tetravalent palladium ions. (I) Silver ions include monovalent silver ions and divalent silver ions. (J) Tungsten ions include tetravalent tungsten ions, pentavalent tungsten ions, and hexavalent tungsten ions. (K) Mercury ions include monovalent mercury ions and divalent mercury ions. (L) Cerium ions include trivalent cerium ions and tetravalent cerium ions. Other valences not in the list may also be employed. Ions of the same element but having different valences may be contained. The elements may be contained in the form of ions and also metal (solid).

The standard redox potentials (potentials) of the metal ions listed as reactive metal ions are lower or higher than the potential of manganese ions. Thus, such metal ions contained together with manganese ions in the positive electrode electrolyte undergo valence-change reactions substantially in order of the potential to function as positive electrode active materials. Among the above listed metal ions, a single species of reactive metal ions may be contained in an embodiment, and plural species of reactive metal ions may be contained in another embodiment. In particular, when vanadium ions are contained as the reactive metal ions, the reliability of the battery is enhanced because vanadium ions have been used as active materials for the existing V-based RF batteries.

In the positive electrode electrolyte, the concentration of reactive metal ions (total concentration when plural species of reactive metal ions are contained) is, for example, 0.001 M or more and 5 M or less. When the concentration is 0.001 M or more, the reactive metal ions together with manganese ions can be effectively used as positive electrode active materials, resulting in an increase in the ratio of positive electrode active material in the positive electrode electrolyte. Thus, an RF battery 1 having a high energy density can be provided. Also, when the concentration is 0.001 M or more, generation of precipitate can be suppressed. The higher the concentration of reactive metal ions, the higher the energy density and the more suppressed generation of precipitate. Thus, the concentration may be 0.1 M or more. However, in consideration of solubility in the solvent, the concentration of reactive metal ions in the positive electrode electrolyte may be 5 M or less, particularly 2 M or less, which contributes to ease of use and ease of production of the electrolyte. When the electrolyte is prepared as an acid aqueous solution, as described later, a relatively high acid concentration allows suppression of generation of precipitate. However, an increase in the acid concentration results in a decrease in the solubility of metal ions. In the RF battery 1 according to the embodiment, both of titanium ions and reactive metal ions are contained, so that generation of precipitate can be suppressed; accordingly, it is not necessary to excessively increase the acid concentration and the concentrations of metal ions can be set to be in practical ranges. The concentration of manganese ions and the concentration of reactive metal ions may be the same in an embodiment and may be different in another embodiment.

Additive Metal Ions

In the RF battery 1 according to the embodiment, the positive electrode electrolyte may further contain, in addition to titanium ions and reactive metal ions, ions that provide the effect of suppressing generation of precipitate such as manganese oxide. These ions may be at least one selected from aluminum ions, cadmium ions, indium ions, tin ions, antimony ions, iridium ions, gold ions, lead ions, bismuth ions, and magnesium ions. For each species of these metal ions for the positive electrode electrolyte, there is at least one ion species in terms of valence. For example, (a) aluminum ions include monovalent aluminum ions, divalent aluminum ions, and trivalent aluminum ions. (b) Cadmium ions include monovalent cadmium ions and divalent cadmium ions. (c) Indium ions include monovalent indium ions, divalent indium ions, and trivalent indium ions. (d) Tin ions include divalent tin ions and tetravalent tin ions. (e) Antimony ions include trivalent antimony ions and pentavalent antimony ions. (f) Iridium ions include monovalent iridium ions, divalent iridium ions, trivalent iridium ions, tetravalent iridium ions, pentavalent iridium ions, and hexavalent iridium ions. (g) Gold ions include monovalent gold ions, divalent gold ions, trivalent gold ions, tetravalent gold ions, and pentavalent gold ions. (h) Lead ions include divalent lead ions and tetravalent lead ions. (i) Bismuth ions include trivalent bismuth ions and pentavalent bismuth ions. (j) Magnesium ions include monovalent magnesium ions and divalent magnesium ions. Other valences not in the list may also be employed. Ions of the same element but having different valences may be contained. The elements may be contained in the form of ions and also metal (solid).

In addition, lithium (Li) ions, beryllium (Be) ions, sodium (Na) ions, potassium (K) ions, calcium (Ca) ions, scandium (Sc) ions, nickel (Ni) ions, zinc (Zn) ions, gallium (Ga) ions, germanium (Ge) ions, rubidium (Rb) ions, strontium (Sr) ions, yttrium (Y) ions, zirconium (Zr) ions, niobium (Nb) ions, technetium (Tc) ions, rhodium (Rh) ions, cesium (Cs) ions, barium (Ba) ions, lanthanoid element (except for cerium) ions, hafnium (Hf) ions, tantalum (Ta) ions, rhenium (Re) ions, osmium (Os) ions, platinum (Pt) ions, thallium (Tl) ions, polonium (Po) ions, francium (Fr) ions, radium (Ra) ions, actinium (Ac) ions, thorium (Th) ions, protactinium (Pa) ions, and uranium (U) ions are expected to provide the effect of suppressing generation of precipitate such as manganese oxide. Accordingly, at least one of the above listed metal ions can also be expected to be used as additive metal ions.

For the metal ions listed as additive metal ions, even use of a very small amount of such metal ions provides the effect of suppressing generation of precipitate. Accordingly, when such additive metal ions are contained, the resultant decrease in the ratio of active material in the electrolyte tends to be suppressed. By using a very small amount of additive metal ions, a decrease in the ratio of active material in the positive electrode electrolyte due to the presence of titanium ions and additive metal ions is suppressed, so that a high energy density is expected to be achieved. The above listed metal ions mainly function as an agent for suppressing generation of precipitate and substantially do not function as active materials. However, some ion species function as active materials (for example, lead ions). When additive metal ions function also as positive electrode active materials, the energy density can be further increased. Among the above listed metal ions, a single species of additive metal ions may be contained in an embodiment and plural species of additive metal ions may be contained in another embodiment.

In the positive electrode electrolyte, the concentration of additive metal ions (total concentration when plural species of additive metal ions are contained) is, for example, 0.001 M or more and 1 M or less. When the concentration is 0.001 M or more, the additive metal ions together with titanium ions and reactive metal ions allow effective suppression of generation of precipitate. The higher the concentration of additive metal ions, the stronger the expected effect of suppressing generation of precipitate. Thus, the concentration may be 0.005 M or more, particularly 0.01 M or more. However, an excessively high concentration of additive metal ions results in a decrease in the ratio of active material in the electrolyte, leading to a decrease in the energy density. Accordingly, the concentration of additive metal ions is preferably 0.8 M or less, more preferably 0.5 M or less.

Negative Electrode Electrolyte

In the RF battery 1 according to the embodiment, the negative electrode electrolyte contains, as a negative electrode active material, at least one species of metal ions selected from titanium ions, vanadium ions, chromium ions, and zinc ions. Each species of these metal ions may be combined with manganese ions serving as a positive electrode active material, to thereby form a redox pair having a high electromotive force. For each species of these metal ions serving as negative electrode active materials for the negative electrode electrolyte, there is at least one ion species in terms of valence. Ions of the same element but having different valences may be contained. The elements may be contained in the form of ions and also metal (solid). Among the listed metal ions, a single species of metal ions may be contained in an embodiment and plural species of metal ions may be contained in another embodiment.

In particular, a Mn—Ti-based RF battery containing titanium ions as the negative electrode active material provides an electromotive force of about 1.4 V. When titanium ions are contained as the negative electrode active material, the electrolytes of the two electrodes contain titanium ions. In this embodiment, even when titanium ions migrate from electrodes with time during repeated charge and discharge, titanium ions of the negative electrode electrolyte that have entered the positive electrode electrolyte can function as an agent for suppressing generation of precipitate in the positive electrode electrolyte. The titanium ions of the positive electrode electrolyte that have entered the negative electrode electrolyte can function as a negative electrode active material, so that a decrease in the battery capacity due to a decrease in the amount of the negative electrode active material tends to be suppressed. For titanium ions, the negative electrode electrolyte contains at least one ion species in terms of valence: for example, trivalent titanium ions or tetravalent titanium ions.

In particular, when vanadium ions are contained as the negative electrode active material in an embodiment, the reliability of the battery is enhanced because vanadium ions have been used as negative electrode active materials for the existing V-based RF batteries.

When plural species of metal ions are contained as negative electrode active materials, these species can be combined in consideration of the standard redox potentials (potentials) of the metal ions: specifically, metal ions having a higher potential and metal ions having a lower potential can be combined. In this case, as in the positive electrode electrolyte, the utilization ratio of metal ions is also increased in the negative electrode electrolyte and the energy density can be increased.

A specific example in which plural species of metal ions are contained as negative electrode active materials is an embodiment in which titanium ions and vanadium ions are contained. This embodiment can provide an RF battery 1 having a high electromotive force and high reliability as described above. In particular, an embodiment can be employed in which the positive electrode electrolyte contains vanadium ions as reactive metal ions and the negative electrode electrolyte contains titanium ions and vanadium ions. In this embodiment, the electrolytes of the two electrodes contain titanium ions and vanadium ions and the electrolytes of the two electrodes have plural ion species in common, so that advantages (i) to (iv) described later can be provided. In this embodiment, for the electrolyte of each electrode, the concentration of titanium ions is, for example, about 0.3 M or more and about 5 M or less, and the concentration of vanadium ions is, for example, about 0.3 M or more and about 5 M or less. In this embodiment, the positive electrode electrolyte contains plural species of metal ions that are manganese ions and vanadium ions as positive electrode active materials and the negative electrode electrolyte contains plural species of metal ions that are titanium ions and vanadium ions as negative electrode active materials, so that the ratios of active materials in the electrolytes of the two electrodes can be increased. As a result, an RF battery 1 having a higher energy density can be provided.

The concentration of metal ions listed as negative electrode active materials (total concentration when plural species of metal ions are contained) is, for example, 0.3 M or more and 5 M or less. When the concentration is 0.3 M or more, a sufficiently high energy density (for example, about 10 kWh/m$^3$) for a high-capacity secondary battery can be provided. The higher the concentration of the metal ions in the negative electrode electrolyte, the higher the energy density. Accordingly, the concentration may be 0.5 M or more, particularly 1.0 M or more. However, in consideration of solubility in the solvent, the concentration of the metal ions in the negative electrode electrolyte may be 5 M or less, particularly 2 M or less, which contributes to ease of use and ease of production of the electrolyte. In particular, when 0.3 M or more and 5 M or less of titanium ions are contained as a negative electrode active material, as described above, a Mn—Ti-based RF battery having a high energy density can be provided. The total concentration of the concentration of manganese ions and the concentration of reactive metal ions that mainly function as positive electrode active materials in the positive electrode electrolyte, and the concentration of metal ions that mainly function as a negative electrode active material in the negative electrode electrolyte, may be the same in an embodiment and may be different in another embodiment.

The negative electrode electrolyte may contain at least one of the above listed ion species as additive metal ions. In other words, at least one of the positive electrode electrolyte and the negative electrode electrolyte may contain additive metal ions in an embodiment. When the negative electrode electrolyte contains at least one species of additive metal ions, the following advantages are expected to be provided: (1) the battery reactivity of metal ions that function as a negative electrode active material can be enhanced (the reaction rate can be increased), (2) some ion species function as active materials (tin ions, zinc ions, and the like), and (3) generation of hydrogen due to decomposition of water can be suppressed.

In addition, the negative electrode electrolyte that contains the metal ions serving as a negative electrode active material, such as titanium ions, may have a configuration below:

(a) a configuration of containing manganese ions, (b) a configuration of containing at least one ion species that is the same as in the reactive metal ions contained in the positive electrode electrolyte, (c) a configuration of containing at least one ion species that is the same as at least one ion species of the additive metal ions listed above and contained in the positive electrode electrolyte, (d) a configuration that satisfies two of the configuration (a) to the configuration (c) (for example, configuration (a)+configuration (b)), or (e) a configuration that satisfies all the configuration (a) to the configuration (c).

In each of the configuration (a) to the configuration (e), the positive electrode electrolyte and the negative electrode electrolyte have at least one ion species in common. As a result, these configurations provide the following advantages: (i) a decrease in the battery capacity due to a decrease in the amount of active material with time tends to be avoided, (ii) an imbalance between the liquid amounts of the electrolytes at the two electrodes due to liquid migration is easily corrected, (iii) changes in the concentrations due to migration of metal ions to counter electrodes tend to be prevented, and (iv) the electrolytes are easily produced. For example, in the configuration (a), at least a decrease in the amount of the positive electrode active material with time tends to be suppressed. The concentrations of metal ions present in common between the electrolytes of the two electrodes may be different for the two electrodes in an embodiment and may be the same for the two electrodes in another embodiment. The metal ions present in common between the electrolytes of the two electrodes may have different valences for the two electrodes in an embodiment and may have the same valence for the two electrodes in another embodiment.

In particular, for the configuration (a) to the configuration (e), in a configuration of containing titanium ions as a negative electrode active material, the positive electrode electrolyte and the negative electrode electrolyte have plural ion species in common, preferably all the ion species are the same between the electrolytes, so that the above-described advantages (i) to (iv) tend to be further provided. More specifically, examples of the configuration include a configuration (a) in which the negative electrode electrolyte contains titanium ions and manganese ions, a configuration (d) (configuration (a)+configuration (b)) in which the negative electrode electrolyte contains titanium ions, manganese ions, and the same ion species of reactive metal ions as in the positive electrode electrolyte, and a configuration (e) in which the negative electrode electrolyte contains titanium ions, manganese ions, and the same ion species of reactive metal ions and additive metal ions as in the positive electrode electrolyte. In a configuration in which the electrolytes of the two electrodes have an ion species in common, when the concentrations of the ion species present in common are the same for the two electrodes, the above-described advantages (i) to (iv) tend to be further provided. When all the ion species are the same between the electrolytes of the two electrodes and the electrolytes have the individual ion species at the same concentrations, a single electrolyte can be used as electrolytes of the two electrodes, which further contributes to ease of production of the electrolyte. When the negative electrode electrolyte contains manganese ions, the concentration of manganese ions in the negative electrode electrolyte is, for example, 0.3 M or more and 5 M or less. When this concentration range is satisfied, as described above, manganese ions are easily dissolved and the electrolyte is easily produced. When the negative electrode electrolyte contains manganese ions, these ions are, for example, divalent manganese ions or trivalent manganese ions. When the electrolytes of the two electrodes contain reactive metal ions or additive metal ions, ions may be contained such that at least one ion species is different between the electrodes.

When the electrolytes of the two electrodes contain titanium ions, the Ti content of the positive electrode electrolyte can be adjusted in accordance with the concentration of titanium ions of the negative electrode electrolyte. For example, the Ti content of the positive electrode electrolyte can be set to 0.3 M or more, to 0.5 M or more, or particularly to 1 M or more. However, in consideration of solubility in the solvent, the Ti content of the positive electrode electrolyte may be 5 M or less, particularly 2 M or less, which contributes to ease of use. In this configuration, the titanium ions in the electrolyte of each electrode may be trivalent titanium ions or tetravalent titanium ions.

When the electrolytes of the two electrodes contain manganese ions and titanium ions such that the electrolytes of the two electrodes have the same concentration of manganese ions and the electrolytes of the two electrodes have the same concentration of titanium ions, the above-described advantages (i) to (iv) tend to be further provided. In this configuration, in the electrolyte of each electrode, the concentration of manganese ions is, for example, 0.3 M or more and 5 M or less and the concentration of titanium ions is, for example, 0.3 M or more and 5 M or less. In this configuration, in the electrolyte of each electrode, manganese ions may be divalent manganese ions or trivalent manganese ions and titanium ions may be trivalent titanium ions or tetravalent titanium ions.

Solvent of Electrolyte Etc.

The above-described metal ions contained in the electrolyte of each electrode are all water-soluble ions. Accordingly, as the positive electrode electrolyte and the negative electrode electrolyte, aqueous solutions containing water as the solvent are preferably used. In particular, when such an electrolyte is prepared as an acid aqueous solution containing sulfuric acid or sulfate, the following plural advantages are expected to be provided: (1) enhancement of the stability of plural species of metal ions, enhancement of the reactivity of metal ions serving as an active material, and enhancement of solubility may be achieved, (2) even when metal ions having a high potential such as manganese ions are used, side reactions tend not to occur (decomposition tends not to occur), (3) a high ion conductivity and a low battery internal resistance are achieved, (4) unlike the case of using hydrochloric acid, chlorine gas is not generated, and (5) the electrolyte is easily obtained from sulfate or the like and water, that is, easily produced. Such an acid aqueous solution (electrolyte) produced from sulfuric acid or sulfate contains, for example, sulfate anions ($SO_4^{2-}$). When the electrolyte is prepared as an acid solution having a high concentration of acid, generation of precipitate such as manganese oxide can be suppressed to a certain degree. For an electrolyte containing metal ions that can suppress generation of precipitate, such as reactive metal ions, even when the concentration of acid in the electrolyte is set to a relatively low value, generation of precipitate may be suppressed. Such electrolytes may be aqueous solutions prepared from known acids or known salts other than sulfuric acid and sulfate.

(Other Configurations)

Electrodes

The material of the positive electrode 104 and the negative electrode 105 may be a material mainly formed of carbon fibers, such as non-woven fabric (carbon felt) or paper. Use of carbon felt electrodes provides the following advantages: (1) in the case of using aqueous solutions as electrolytes, even at the oxygen generation potential during charge, oxygen gas tends not to generate, (2) the surface area is large, and (3) the permeability to electrolytes is high. Known electrodes can be used.

Membrane

The membrane 101 is, for example, an ion-exchange membrane such as a cation-exchange membrane or an anion-exchange membrane. Such an ion-exchange membrane provides the following advantages: (1) a high capability of separating metal ions serving as a positive electrode active material and metal ions serving as a negative electrode active material from each other is provided, and (2) a high permeability to $H^+$ ions (charge carriers within the battery) is provided. Thus, ion-exchange membranes can be suitably used as the membrane 101. Known membranes can be used.

Hereinafter, the stability of electrolytes and battery characteristics of RF batteries will be specifically described with reference to Test Examples.

Test Example 1

Positive electrode electrolytes containing manganese ions and titanium ions and a negative electrode electrolyte containing titanium ions were prepared and an RF battery system illustrated in FIG. 1 was constructed. The RF battery system was charged and then inspected for the state of precipitation.

In this test, prepared were Samples No. 1-100 and No. 1-110 containing manganese ions alone as the positive electrode active material, and Samples No. 1-1 and No. 1-2 containing manganese ions and vanadium ions (reactive metal ions) as positive electrode active materials.

The positive electrode electrolyte of Sample No. 1-1 was produced (as an aqueous solution) with manganese sulfate, vanadium oxosulfate, titanium sulfate, and sulfuric acid. In the produced positive electrode electrolyte, the concentration of manganese ions (divalent) was 0.5 M, the concentration of vanadium ions (tetravalent) was 0.5 M, the concentration of titanium ions (tetravalent) was 0.5 M, and the concentration of sulfate ions (the total concentration in the electrolyte, described as the total concentration in Table. The same applies to Test Examples below.) was 4.5 M.

The positive electrode electrolyte of Sample No. 1-2 was produced (as an aqueous solution) with manganese sulfate, vanadium oxosulfate, titanium sulfate, bismuth sulfate, and sulfuric acid. In the produced positive electrode electrolyte, the concentration of manganese ions (divalent) was 0.5 M, the concentration of vanadium ions (tetravalent) was 0.5 M, the concentration of titanium ions (tetravalent) was 0.5 M, the concentration of bismuth ions (trivalent) was 0.05 M, and the concentration of sulfate ions (total concentration) was 4.575 M.

The positive electrode electrolyte of Sample No. 1-100 was produced (as an aqueous solution) with manganese sulfate and sulfuric acid. In the produced positive electrode electrolyte, the concentration of manganese ions (divalent) was 0.5 M and the concentration of sulfate ions (total concentration) was 3.5 M.

The positive electrode electrolyte of Sample No. 1-110 was produced with manganese sulfate, titanium sulfate, and sulfuric acid. In the produced positive electrode electrolyte, the concentration of manganese ions (divalent) was 0.5 M, the concentration of titanium ions (tetravalent) was 0.5 M, and the concentration of sulfate ions (total concentration) was 4.0 M.

For all the Samples, a negative electrode electrolyte was produced (as an aqueous solution) with titanium sulfate and sulfuric acid. In the produced negative electrode electrolyte, the concentration of titanium ions (tetravalent) was 1.0 M and the concentration of sulfate ions (total concentration) was 4.0 M.

Small cells having an electrode reaction area of 9 cm$^2$ were produced. The electrodes were formed of carbon felt and the membranes were ion-exchange membranes.

The produced electrolytes for the electrodes were each prepared in an amount of 7 ml and charge was performed with the produced small cells. For charge conditions, charge was performed with a constant current at 630 mA (constant current having a current density of 70 mA/cm$^2$) until the state of charge (SOC) of manganese ions reached 70%. Immediately after this charge, the inner wall of the positive electrode electrolyte tank was visually inspected. The state of charge of manganese ions (SOC, %) was calculated with (charge quantity of electricity/theoretical quantity of electricity in single-electron reaction)×100. The charge quantity of electricity and the theoretical quantity of electricity in single-electron reaction are defined below. The single-electron reaction for manganese ions is $Mn^{2+} \rightarrow Mn^{3+} + e^-$.

Charge Quantity of Electricity (A·h)=Charge current (A)×Charge time (h)

Theoretical Quantity of Electricity in Single-Electron Reaction (A·h)=Volume of Electrolyte (L)×Concentration of Manganese Ions (mol/L)×Faraday constant: 96,485 (A·s/mol)×1 (electron)/3600

As a result, for Sample No. 1-100 in which the positive electrode electrolyte contained manganese ions alone, a brown substance (solid) was found to adhere to a region of the inner wall of the positive electrode electrolyte tank, the region corresponding to a region in which the positive electrode electrolyte was present. This brown substance was analyzed and found to be $MnO_2$. This has demonstrated that, in Sample No. 1-100, an increase in the state of charge results in generation of precipitate. On the other hand, for Samples No. 1-1, No. 1-2, and No. 1-110, such substance adhering to the inner wall of the positive electrode electrolyte tank was substantially not observed. This has demonstrated that, in addition to manganese ions, the addition of titanium ions to the positive electrode electrolyte allows suppression of generation of precipitate such as $MnO_2$. In particular, referring to Samples No. 1-1 and No. 1-2, it has been demonstrated that, in addition to manganese ions, the addition of titanium ions and metal ions that are vanadium ions or metal ions that are bismuth ions to the positive electrode electrolyte allows suppression of generation of precipitate such as $MnO_2$.

Test Example 2

Positive electrode electrolytes containing manganese ions and titanium ions and a negative electrode electrolyte containing titanium ions were prepared and an RF battery system illustrated in FIG. 1 was constructed. After charge was performed, state of charge (SOC) was determined.

The positive electrode electrolytes and the negative electrode electrolyte were the same as in Test Example 1 in terms of ion species and concentration. Specifically, for Sample No. 2-1, a positive electrode electrolyte was prepared such that the concentration of manganese ions (divalent) was 0.5 M, the concentration of vanadium ions (tetravalent) was 0.5 M, the concentration of titanium ions (tetravalent) was 0.5 M, and the concentration of sulfate ions (total concentration) was 4.5 M. For Sample No. 2-2, a positive electrode electrolyte was prepared such that the concentration of manganese ions (divalent) was 0.5 M, the concentration of vanadium ions (tetravalent) was 0.5 M, the concentration of titanium ions (tetravalent) was 0.5 M, the concentration of bismuth ions (trivalent) was 0.05 M, and the concentration of sulfate ions (total concentration) was 4.575 M. For Sample No. 2-100, a positive electrode electrolyte was prepared such that the concentration of manganese ions (divalent) was 0.5 M and the concentration of sulfate ions (total concentration) was 3.5 M. For Sample No. 2-110, a positive electrode electrolyte was prepared such that the concentration of manganese ions (divalent) was 0.5 M, the concentration of titanium ions (tetravalent) was 0.5 M, and the concentration of sulfate ions (total concentration) was 4.0 M. For all the Samples, a negative electrode electrolyte was prepared such that the concentration of titanium ions (tetravalent) was 1.0 M and the concentration of sulfate ions (total concentration) was 4.0 M. For each Sample, 9 ml of the positive electrode electrolyte and 30 ml of the negative electrode electrolyte were prepared.

Small cells having an electrode reaction area of 9 cm$^2$ were produced and charge was performed with the prepared electrolytes. The charge conditions were as follows: a constant current at 630 mA (constant current having a current density of 70 mA/cm$^2$) and an end-of-charge voltage of 2.0 V. At the end of charge, the state of charge of manganese ions (SOC, %) was determined. The results are described in Table 1. In addition, after the charge was completed, the amount of precipitate (here $MnO_2$) present in the tank and the like was determined by visual inspection. The results are described in Table 1.

TABLE 1

| | Sample No. | | | |
| --- | --- | --- | --- | --- |
| | 2-100 | 2-110 | 2-1 | 2-2 |
| Electrolytes | Positive electrode: Mn alone<br>Positive electrode: 9 ml<br>$Mn^{2+}$ (0.5M)<br>Sulfate (Total: 3.5M) | Positive electrode: Mn + Ti<br>Positive electrode: 9 ml<br>$Mn^{2+}$ (0.5M)<br>$Ti^{4+}$ (0.5M)<br>Sulfate (Total: 4.0M) | Positive electrode: Mn + V + Ti<br>Positive electrode: 9 ml<br>$Mn^{2+}$ (0.5M)<br>$V^{4+}$ (0.5M)<br>$Ti^{4+}$ (0.5M)<br>Sulfate (Total: 4.5M) | Positive electrode: Mn + V + Ti + Bi<br>Positive electrode: 9 ml<br>$Mn^{2+}$ (0.5M)<br>$V^{4+}$ (0.5M)<br>$Ti^{4+}$ (0.5M)<br>$Bi^{3+}$ (0.05M)<br>Sulfate (Total: 4.575M) |

TABLE 1-continued

| | Sample No. | | | |
|---|---|---|---|---|
| | 2-100 | 2-110 | 2-1 | 2-2 |
| | Negative electrode: 30 ml $Ti^{4+}$ (1.0M) Sulfate (Total: 4.0M) | Negative electrode: 30 ml $Ti^{4+}$ (1.0M) Sulfate (Total: 4.0M) | Negative electrode: 30 ml $Ti^{4+}$ (1.0M) Sulfate (Total: 4.0M) | Negative electrode: 30 ml $Ti^{4+}$ (1.0M) Sulfate (Total: 4.0M) |
| SOC of manganese ions (%) at end of charge | 130 | 165 | 137 | 155 |
| Precipitation amount of $MnO_2$ at end of charge | Large | Very small | Very small | Very small |

Table 1 indicates that, compared with Sample No. 2-100 in which the positive electrode electrolyte contains manganese ions alone, the state of charge (SOC) is high in Samples No. 2-1 and No. 2-2 in which the positive electrode electrolytes contain, in addition to manganese ions, metal ions such as vanadium ions. One of the reasons for the increase in the state of charge is probably as follows: in Samples No. 2-1 and No. 2-2, in addition to titanium ions, the metal ions such as vanadium ions allow suppression of generation of precipitate such as $MnO_2$, so that manganese ions can be sufficiently used as an active material. A comparison between Sample No. 2-1 and Sample No. 2-2 has revealed that Sample No. 2-2 in which bismuth ions are contained provides a higher state of charge (SOC). One of the reasons for this is probably that Sample No. 2-2 allows further suppression of generation of precipitate such as $MnO_2$. In the results of this Test Example, Samples No. 2-1 and No. 2-2 have lower states of charge (SOC) than Sample No. 2-110. However, compared with Sample No. 2-100, by suppressing generation of precipitate as described above, an increase in the energy density is probably expected.

Test Example 3

Positive electrode electrolytes containing manganese ions and titanium ions and a negative electrode electrolyte containing titanium ions were prepared and an RF battery system illustrated in FIG. 1 was constructed. Charge and discharge were performed and battery characteristics were determined.

The positive electrode electrolytes and the negative electrode electrolyte were the same as in Test Example 1 in terms of ion species and concentration. Specifically, for Sample No. 3-1, a positive electrode electrolyte was prepared such that the concentration of manganese ions (divalent) was 0.5 M, the concentration of vanadium ions (tetravalent) was 0.5 M, the concentration of titanium ions (tetravalent) was 0.5 M, and the concentration of sulfate ions (total concentration) was 4.5 M. For Sample No. 3-2, a positive electrode electrolyte was prepared such that the concentration of manganese ions (divalent) was 0.5 M, the concentration of vanadium ions (tetravalent) was 0.5 M, the concentration of titanium ions (tetravalent) was 0.5 M, the concentration of bismuth ions (trivalent) was 0.05 M, and the concentration of sulfate ions (total concentration) was 4.575 M. For Sample No. 3-100, a positive electrode electrolyte was prepared such that the concentration of manganese ions (divalent) was 0.5 M and the concentration of sulfate ions (total concentration) was 3.5 M. For Sample No. 3-110, a positive electrode electrolyte was prepared such that the concentration of manganese ions (divalent) was 0.5 M, the concentration of titanium ions (tetravalent) was 0.5 M, and the concentration of sulfate ions (total concentration) was 4.0 M. For all the Samples, a negative electrode electrolyte was prepared such that the concentration of titanium ions (tetravalent) was 1.0 M and the concentration of sulfate ions (total concentration) was 4.0 M. For each Sample, such an electrolyte for each electrode was prepared in an amount of 6 ml.

Small cells having an electrode reaction area of 9 cm² were produced and charge-discharge cycle tests were performed with the prepared electrolytes. The charge-discharge conditions were as follows: a constant current at 630 mA (constant current having a current density of 70 mA/cm²), a voltage of switching from charge (voltage at which charge is switched to discharge) of 1.5 V, a voltage of switching from discharge (voltage at which discharge is switched to charge) of 0 V, and number of cycles=3. And, current efficiency (%) and discharged capacity (Ah/L) were determined. The current efficiency (%) was calculated for each cycle with (discharge time/charge time)×100. The average of the second-cycle current efficiency and the third-cycle current efficiency is described in Table 2. The discharged capacity was calculated for each cycle with (discharge time (s)×current value (A)/3600)/volume of electrolyte (L). The average of the second-cycle discharged capacity and the third-cycle discharged capacity is described in Table 2.

TABLE 2

| | | Sample No. | | | |
|---|---|---|---|---|---|
| | | 3-100 | 3-110 | 3-1 | 3-2 |
| Electrolytes | | Positive electrode: Mn alone | Positive electrode: Mn + Ti | Positive electrode: Mn + V + Ti | Positive electrode: Mn + V + Ti + Bi |
| | | Positive electrode: 6 ml $Mn^{2+}$ (0.5M) Sulfate (Total: 3.5M) | Positive electrode: 6 ml $Mn^{2+}$ (0.5M) $Ti^{4+}$ (0.5M) Sulfate (Total: 4.0M) | Positive electrode: 6 ml $Mn^{2+}$ (0.5M) $V^{4+}$ (0.5M) $Ti^{4+}$ (0.5M) Sulfate (Total: 4.5M) | Positive electrode: 6 ml $Mn^{2+}$ (0.5M) $V^{4+}$ (0.5M) $Ti^{4+}$ (0.5M) $Bi^{3+}$ (0.05M) Sulfate (Total: 4.575M) |

TABLE 2-continued

| | Sample No. | | | |
|---|---|---|---|---|
| | 3-100 | 3-110 | 3-1 | 3-2 |
| | Negative electrode: 6 ml $Ti^{4+}$ (1.0M) Sulfate (Total: 4.0M) | Negative electrode: 6 ml $Ti^{4+}$ (1.0M) Sulfate (Total: 4.0M) | Negative electrode: 6 ml $Ti^{4+}$ (1.0M) Sulfate (Total: 4.0M) | Negative electrode: 6 ml $Ti^{4+}$ (1.0M) Sulfate (Total: 4.0M) |
| Current efficiency (%) | 94.4 | 98.7 | 99.1 | 99.1 |
| Discharged capacity (Ah/L) | 4.5 | 6.5 | 10.2 | 9.3 |

Table 2 indicates that, compared with Sample No. 3-100 in which the positive electrode electrolyte contains manganese ions alone, the current efficiency and discharged capacity are high in Samples No. 3-1 and No. 3-2 in which the positive electrode electrolytes contain, in addition to manganese ions, metal ions such as titanium ions and vanadium ions. The current efficiency and discharged capacity in Samples No. 3-1 and No. 3-2 are high, even compared with Sample No. 3-110 in which the positive electrode electrolyte contains manganese ions and titanium ions but not vanadium ions. In particular, Samples No. 3-1 and No. 3-2 provide discharged capacities 1.5 or more times higher than those of Samples No. 3-100 and No. 3-110. Thus, Samples No. 3-1 and No. 3-2 are expected to be suitably used as high-capacity batteries. One of the reasons for the increase in the current efficiency and discharged capacity is probably as follows: in Samples No. 3-1 and No. 3-2, in addition to titanium ions, metal ions such as vanadium ions allow suppression of generation of precipitate such as $MnO_2$, so that manganese ions can be sufficiently used as an active material.

Test Example 4

As positive electrode electrolytes and negative electrode electrolytes, electrolytes each containing manganese ions and titanium ions were prepared and an RF battery system illustrated in FIG. 1 was constructed. Charge and discharge were performed and battery characteristics were determined.

The positive electrode electrolytes and the negative electrode electrolytes were produced with sulfates and sulfuric acid as in Test Example 1. For Sample No. 4-1, a positive electrode electrolyte (6 ml) was prepared such that the concentration of manganese ions (divalent) was 0.5 M, the concentration of vanadium ions (tetravalent) was 0.5 M, the concentration of titanium ions (tetravalent) was 0.5 M, and the concentration of sulfate ions (total concentration) was 4.5 M. A negative electrode electrolyte (12 ml) was prepared such that the concentration of titanium ions (tetravalent) was 0.5 M, the concentration of manganese ions (divalent) was 0.5 M, and the concentration of sulfate ions (total concentration) was 4.0 M.

For Sample No. 4-2, a positive electrode electrolyte and a negative electrode electrolyte were prepared such that the concentration of manganese ions (divalent) was 0.5 M, the concentration of vanadium ions (trivalent) was 0.25 M, the concentration of vanadium ions (tetravalent) was 0.25 M, the concentration of titanium ions (tetravalent) was 0.5 M, and the concentration of sulfate ions (total concentration) was 4.5 M. For Sample No. 4-2, the electrolyte of each electrode was prepared in an amount of 6 ml.

For Sample No. 4-3, a positive electrode electrolyte (6 ml) was prepared such that the concentration of manganese ions (divalent) was 0.5 M, the concentration of vanadium ions (tetravalent) was 0.5 M, the concentration of titanium ions (tetravalent) was 0.5 M, the concentration of bismuth ions (trivalent) was 0.05 M, and the concentration of sulfate ions (total concentration) was 4.575 M. A negative electrode electrolyte (12 ml) was prepared such that the concentration of titanium ions (tetravalent) was 0.5 M, the concentration of manganese ions (divalent) was 0.5 M, and the concentration of sulfate ions (total concentration) was 4.0 M.

For Sample No. 4-4, a positive electrode electrolyte was prepared such that the concentration of manganese ions (divalent) was 0.5 M, the concentration of vanadium ions (trivalent) was 0.25 M, the concentration of vanadium ions (tetravalent) was 0.25 M, the concentration of titanium ions (tetravalent) was 0.5 M, the concentration of bismuth ions (trivalent) was 0.05 M, and the concentration of sulfate ions (total concentration) was 4.575 M. A negative electrode electrolyte was prepared such that the concentration of titanium ions (tetravalent) was 0.5 M, the concentration of manganese ions (divalent) was 0.5 M, the concentration of vanadium ions (trivalent) was 0.25 M, the concentration of vanadium ions (tetravalent) was 0.25 M, and the concentration of sulfate ions (total concentration) was 4.5 M. For Sample No. 4-4, the electrolyte of each electrode was prepared in an amount of 6 ml.

For Sample No. 4-5, a positive electrode electrolyte and a negative electrode electrolyte were prepared such that the concentration of manganese ions (divalent) was 0.5 M, the concentration of vanadium ions (trivalent) was 0.25 M, the concentration of vanadium ions (tetravalent) was 0.25 M, the concentration of titanium ions (tetravalent) was 0.5 M, the concentration of bismuth ions (trivalent) was 0.05 M, and the concentration of sulfate ions (total concentration) was 4.575 M. For Sample No. 4-5, the electrolyte of each electrode was prepared in an amount of 6 ml.

The prepared electrolytes were used and small cells (having an electrode reaction area of 9 cm²) were produced as in Test Example 3. Charge-discharge cycle tests were performed and the current efficiency and discharged capacity were measured. The results are described in Table 3. The charge-discharge conditions and the measurement methods were the same as in Test Example 3. However, for Samples No. 4-2, No. 4-4, and No. 4-5, charge-discharge conditions were set such that the voltage of switching from charge was 1.85 V and the voltage of switching from discharge was 0 V.

TABLE 3

| | Sample No. | | | | |
|---|---|---|---|---|---|
| | 4-1 | 4-2 | 4-3 | 4-4 | 4-5 |
| Electrolytes | Positive electrode: Ti + Mn + V<br>Negative electrode: Ti + Mn<br>Positive electrode: 6 ml<br>$Mn^{2+}$ (0.5M)<br>$V^{4+}$ (0.5M)<br>$Ti^{4+}$ (0.5M)<br>Sulfate (Total: 4.5M)<br><br>Negative electrode: 12 ml<br>$Ti^{4+}$ (1.0M)<br>$Mn^{2+}$ (0.5M)<br>Sulfate (Total: 4.0M) | Positive and negative electrodes: Ti + Mn + V<br>Each of positive and negative electrodes: 6 ml<br>$Mn^{2+}$ (0.5M)<br>$V^{3+}$ (0.25M)<br>$V^{4+}$ (0.25M)<br>$Ti^{4+}$ (0.5M)<br>Sulfate (Total: 4.5M) | Positive electrode: Ti + Mn + V + Bi<br>Negative electrode: Ti + Mn<br>Positive electrode: 6 ml<br>$Mn^{2+}$ (0.5M)<br>$V^{4+}$ (0.5M)<br>$Ti^{4+}$ (0.5M)<br>$Bi^{3+}$ (0.05M)<br>Sulfate (Total: 4.575M)<br><br>Negative electrode: 12 ml<br>$Ti^{4+}$ (0.5M)<br>$Mn^{2+}$ (0.5M)<br>Sulfate (Total: 4.0M) | Positive electrode: Ti + Mn + V + Bi<br>Negative electrode: Ti + Mn + V<br>Positive electrode: 6 ml<br>$Mn^{2+}$ (0.5M)<br>$V^{3+}$ (0.25M)<br>$V^{4+}$ (0.25M)<br>$Ti^{4+}$ (0.5M)<br>$Bi^{3+}$ (0.05M)<br>Sulfate (Total: 4.575M)<br><br>Negative electrode: 6 ml<br>$Ti^{4+}$ (0.5M)<br>$Mn^{2+}$ (0.5M)<br>$V^{3+}$ (0.25M)<br>$V^{4+}$ (0.25M)<br>Sulfate (Total: 4.5M) | Positive and negative electrodes: Ti + Mn + V + Bi<br>Each of positive and negative electrodes: 6 ml<br>$Mn^{2+}$ (0.5M)<br>$V^{3+}$ (0.25M)<br>$V^{4+}$ (0.25M)<br>$Ti^{4+}$ (0.5M)<br>$Bi^{3+}$ (0.05M)<br>Sulfate (Total: 4.575M) |
| Current efficiency (%) | 99.6 | 98.8 | 99.5 | 99.0 | 98.7 |
| Discharged capacity (Ah/L) | 5.6 | 10.0 | 5.5 | 10.1 | 11.4 |

Table 3 indicates that Samples No. 4-1 to No. 4-5 in which the positive electrode electrolytes contain, in addition to manganese ions, metal ions such as vanadium ions have high current efficiency and also have discharged capacity that is higher than or equivalent to that of the case where the positive electrode electrolyte contains manganese ions alone (Sample No. 3-100 described above). In particular, Samples No. 4-2, No. 4-4, and No. 4-5 provide discharged capacities about 1.5 or more times higher than the discharged capacity of Sample No. 3-100. One of the reasons for the increase in the current efficiency and the discharged capacity is probably that, in Samples No. 4-1 to No. 4-5, in addition to titanium ions, metal ions such as vanadium ions allow suppression of generation of precipitate such as $MnO_2$, so that manganese ions can be sufficiently used as an active material, and vanadium ions can also be used as an active material. In addition, in each of Samples No. 4-1 to No. 4-5, the positive electrode electrolyte and the negative electrode electrolyte have some ion species of metal ions in common, so that a decrease in the amount of active material due to ion migration with time is suppressed, liquid migration is easily dealt with, and production is easily performed. In these respects, such configurations are practical and easily used. In particular, for each of Samples No. 4-2 and No. 4-5, the metal ions are the same between the electrolytes of the electrodes (in addition, the individual spices of these metal ions are at the same concentrations), so that the above-described advantages of suppression of a decrease in the amount of active material, ease of dealing with liquid migration, and ease of production of electrolytes tend to be further provided, which contributes to ease of use.

Test Example 5

Positive electrode electrolytes containing manganese ions and titanium ions and a negative electrode electrolyte containing titanium ions were prepared and an RF battery system illustrated in FIG. 1 was constructed. Charge and discharge were performed and battery characteristics were determined.

For positive electrode electrolytes and a negative electrode electrolyte, electrolytes having ion species and concentrations in Table 4 were used. Specifically, for Sample No. 5-1, a positive electrode electrolyte was prepared from manganese sulfate, titanium sulfate, sulfuric acid, and iron (II) sulfate, such that the concentration of titanium ions (tetravalent) was 0.5 M, the concentration of manganese ions (divalent) was 0.5 M, the concentration of sulfate ions (total concentration) was 4.5 M, and the concentration of Fe ions (divalent) was 0.5 M.

For Sample No. 5-2, a positive electrode electrolyte was prepared from manganese sulfate, titanium sulfate, sulfuric acid, and cerium(III) sulfate such that the concentration of titanium ions (tetravalent) was 0.5 M, the concentration of manganese ions (divalent) was 0.5 M, the concentration of sulfate ions (total concentration) was 4.15 M, and the concentration of Ce ions (trivalent) was 0.1 M.

For Sample No. 5-3, a positive electrode electrolyte was prepared from manganese sulfate, titanium sulfate, sulfuric acid, and disodium molybdate such that the concentration of titanium ions (tetravalent) was 0.5 M, the concentration of manganese ions (divalent) was 0.5 M, the concentration of sulfate ions (total concentration) was 4.0 M, and the concentration of Mo ions (hexavalent) was 0.01 M.

For Sample No. 5-4, a positive electrode electrolyte was prepared from manganese sulfate, titanium sulfate, and sulfuric acid such that the concentration of titanium ions (tetravalent) was 0.5 M, the concentration of manganese ions (divalent) was 0.5 M, and the concentration of sulfate ions (total concentration) was 4.0 M.

For all the Samples, a negative electrode electrolyte was prepared such that the concentration of titanium ions (tetravalent) was 1.0 M and the concentration of sulfate ions (total concentration) was 4.0 M. For each Sample, the electrolyte of each electrode was prepared in an amount of 6 ml.

Small cells having an electrode reaction area of 9 $cm^2$ were produced and charge-discharge cycle tests were performed with the prepared electrolytes. The charge-discharge conditions were as follows: a constant current at 630 mA (constant current having a current density of 70 $mA/cm^2$), a voltage of switching from charge (voltage at which charge is switched to discharge) of 1.8 V, a voltage of switching from discharge (voltage at which discharge is switched to charge) of 0 V, and a number of cycles=3. And, discharged capacity (Ah/L) was determined. The discharged capacity was calculated for each cycle with (discharge time (s)× current value (A)/3600)/volume of electrolyte (L). The average of the second-cycle discharged capacity and the third-cycle discharged capacity is described in Table 4.

TABLE 4

| Sample No. | Ti (M) | Mn (M) | Sulfate (M) | Addition metal | Discharged capacity (Ah/L) |
|---|---|---|---|---|---|
| 5-1 | 0.5 | 0.5 | 4.5 | Fe0.5M | 11.8 |
| 5-2 | 0.5 | 0.5 | 4.15 | Ce0.1M | 11.1 |
| 5-3 | 0.5 | 0.5 | 4.0 | Mo0.01M | 8.1 |
| 5-4 | 0.5 | 0.5 | 4.0 | No addition | 6.5 |

Table 4 indicates that Samples No. 5-1 to No. 5-3 in which the positive electrode electrolytes contain, in addition to manganese ions, titanium ions and metal ions of an addition metal (Fe, Ce, or Mo) provide higher discharged capacities (No. 5-1 (11.8 Ah/L), No. 5-2 (11.1 Ah/L), No. 5-3 (8.1 Ah/L)) than Sample No. 5-4 (6.5 Ah/L) in which the positive electrode electrolyte contains manganese ions and titanium ions alone. One of the reasons for the increase in the discharged capacity is probably that, in Samples No. 5-1 to No. 5-3, in addition to titanium ions, the metal ions that are addition metal (Fe, Ce, or Mo) ions allow suppression of generation of precipitate such as $MnO_2$, so that manganese ions were sufficiently used as an active material. Another reason for the increase in the discharged capacity is probably that, in Samples No. 5-1 to No. 5-4, in addition to manganese ions, the metal ions being contained function as active materials to thereby increase the energy density.

The results of Test Examples 1 to 5 have demonstrated the following. A positive electrode electrolyte is prepared so as to contain manganese ions, titanium ions, and specific metal ions (reactive metal ions), to thereby provide a redox flow battery in which generation of precipitate such as manganese oxide can be suppressed and battery characteristics are excellent: the electromotive force is high, the state of charge is increased, the current efficiency is increased, and the discharged capacity is increased. Since this redox flow battery has a high energy density and a high discharged capacity, the amounts of electrolytes can be reduced, so that, for example, reduction of the size and reduction of the electrolyte cost can be expected. When the electrolytes of the two electrodes have plural ion species in common, in particular, all the ion species are the same between the electrolytes, the electrolytes allow ease of dealing with liquid migration and ease of production of electrolytes. A redox flow battery containing such electrolytes is practical and easily subjected to operation control, for example.

INDUSTRIAL APPLICABILITY

Redox flow batteries according to the present invention can be suitably used as high-capacity secondary batteries intended to achieve, for natural energy power generation such as photovoltaic power generation and wind power generation, stabilization of output variations, storage of surplus power, and load leveling, for example. Redox flow batteries according to the present invention can also be suitably used as high-capacity secondary batteries that are placed adjacent to ordinary power plants and used to address instantaneous voltage drop and power failure and to achieve load leveling.

REFERENCE SIGNS LIST 1 redox flow battery (RF battery)
100 battery cell
101 membrane
102 positive electrode cell
103 negative electrode cell
104 positive electrode
105 negative electrode
106 positive electrode electrolyte tank
107 negative electrode electrolyte tank
108 to 111 ducts
112, 113 pumps
200 alternating current/direct current converter
210 transformer unit
300 power generation unit
400 power system/consumer

The invention claimed is:

1. A redox flow battery comprising a battery cell including a positive electrode, a negative electrode, and a membrane interposed between the electrodes, the battery being configured to be charged and discharged while a positive electrode electrolyte and a negative electrode electrolyte are supplied to the battery cell,
   wherein the positive electrode electrolyte contains manganese ions, titanium ions, and reactive metal ions,
   the negative electrode electrolyte contains at least one species of metal ions selected from titanium ions, vanadium ions, chromium ions, and zinc ions, and
   the reactive metal ions are at least one selected from vanadium ions, iron ions, cobalt ions, copper ions, molybdenum ions, ruthenium ions, palladium ions, silver ions, tungsten ions, and cerium ions.

2. The redox flow battery according to claim 1, wherein the positive electrode electrolyte further contains additive metal ions, and
   the additive metal ions are at least one selected from aluminum ions, cadmium ions, indium ions, tin ions, antimony ions, iridium ions, gold ions, lead ions, bismuth ions, and magnesium ions.

3. The redox flow battery according to claim 1, wherein a concentration of the reactive metal ions in the positive electrode electrolyte is 0.001 M or more and 5 M or less.

4. The redox flow battery according to claim 2, wherein a concentration of the additive metal ions in the positive electrode electrolyte is 0.001 M or more and 1 M or less.

5. The redox flow battery according to claim 1, wherein at least one of a concentration of the manganese ions in the positive electrode electrolyte and a concentration of the metal ions in the negative electrode electrolyte is 0.3 M or more and 5 M or less.

6. The redox flow battery according to claim 1, wherein the negative electrode electrolyte contains, as the metal ions, titanium ions, and
   at least one of a concentration of the manganese ions in the positive electrode electrolyte and a concentration of the titanium ions in the negative electrode electrolyte is 0.3 M or more and 5 M or less.

7. The redox flow battery according to claim 1, wherein a concentration of the titanium ions in the positive electrode electrolyte is 5 M or less.

8. The redox flow battery according to claim 1, wherein the reactive metal ions satisfy at least one of (A) to (J) below:
  (A) the vanadium ions are at least one of divalent vanadium ions, trivalent vanadium ions, tetravalent vanadium ions, and pentavalent vanadium ions,
  (B) the iron ions are at least one of divalent iron ions and trivalent iron ions,
  (C) the cobalt ions are at least one of divalent cobalt ions and trivalent cobalt ions,
  (D) the copper ions are at least one of monovalent copper ions and divalent copper ions,
  (E) the molybdenum ions are at least one of tetravalent molybdenum ions, pentavalent molybdenum ions, and hexavalent molybdenum ions,
  (F) the ruthenium ions are at least one of divalent ruthenium ions, trivalent ruthenium ions, and tetravalent ruthenium ions,
  (G) the palladium ions are at least one of divalent palladium ions and tetravalent palladium ions,
  (H) the silver ions are at least one of monovalent silver ions and divalent silver ions,
  (I) the tungsten ions are at least one of tetravalent tungsten ions, pentavalent tungsten ions, and hexavalent tungsten ions, and
  (J) the cerium ions are at least one of trivalent cerium ions and tetravalent cerium ions.

9. The redox flow battery according to claim 1, wherein the negative electrode electrolyte contains titanium ions and further contains manganese ions.

10. The redox flow battery according to claim 2, wherein the negative electrode electrolyte contains titanium ions and further contains manganese ions.

11. The redox flow battery according to claim 9, wherein a concentration of manganese ions in the negative electrode electrolyte is 0.3 M or more and 5 M or less.

12. The redox flow battery according to claim 2, wherein the additive metal ions satisfy at least one of (a) to (j) below:
  (a) the aluminum ions are at least one of monovalent aluminum ions, divalent aluminum ions, and trivalent aluminum ions,
  (b) the cadmium ions are at least one of monovalent cadmium ions and divalent cadmium ions,
  (c) the indium ions are at least one of monovalent indium ions, divalent indium ions, and trivalent indium ions,
  (d) the tin ions are at least one of divalent tin ions and tetravalent tin ions,
  (e) the antimony ions are at least one of trivalent antimony ions and pentavalent antimony ions,
  (f) the iridium ions are at least one of monovalent iridium ions, divalent iridium ions, trivalent iridium ions, tetravalent iridium ions, pentavalent iridium ions, and hexavalent iridium ions,
  (g) the gold ions are at least one of monovalent gold ions, divalent gold ions, trivalent gold ions, tetravalent gold ions, and pentavalent gold ions,
  (h) the lead ions are at least one of divalent lead ions and tetravalent lead ions,
  (i) the bismuth ions are at least one of trivalent bismuth ions and pentavalent bismuth ions, and
  (j) the magnesium ions are at least one of monovalent magnesium ions and divalent magnesium ions.

13. The redox flow battery according to claim 1, wherein the manganese ions are at least one of divalent manganese ions and trivalent manganese ions, and the titanium ions are at least one of trivalent titanium ions and tetravalent titanium ions.

* * * * *